United States Patent [19]
Johnson et al.

[11] Patent Number: 5,521,360
[45] Date of Patent: May 28, 1996

[54] APPARATUS AND METHOD FOR MICROWAVE PROCESSING OF MATERIALS

[75] Inventors: Arvid C. Johnson, Lake in the Hills, Ill.; Robert J. Lauf, Oak Ridge; Don W. Bible, Clinton, both of Tenn.; Robert J. Markunas, Chapel Hill, N.C.

[73] Assignee: Martin Marietta Energy Systems, Inc., Oak Ridge, Tenn.

[21] Appl. No.: 306,305

[22] Filed: Sep. 14, 1994

[51] Int. Cl.$^6$ .................................................. H05B 6/68
[52] U.S. Cl. ........................... 219/709; 219/716; 219/717; 219/697
[58] Field of Search ................................ 219/717, 716, 219/709, 697, 696

[56] References Cited

U.S. PATENT DOCUMENTS

| | | | |
|---|---|---|---|
| 3,611,135 | 10/1971 | Margerum | 324/85 |
| 3,619,252 | 11/1971 | Roscher et al. | 117/66 |
| 3,806,689 | 4/1974 | Kegereis et al. | 219/697 |
| 4,144,468 | 3/1979 | Mourier | 310/72 |
| 4,196,332 | 4/1980 | MacKay et al. | 219/10.55 |
| 4,210,795 | 7/1980 | Lentz | 219/709 |
| 4,314,128 | 2/1982 | Chitre | 219/717 |
| 4,340,796 | 7/1982 | Yamaguchi et al. | 219/10.55 |
| 4,415,789 | 11/1983 | Nobue et al. | 219/10.55 |
| 4,504,718 | 3/1985 | Okatsuka et al. | 219/10.55 |
| 4,593,167 | 6/1986 | Nilssen | 219/10.55 |
| 4,714,812 | 12/1987 | Haagensen et al. | 219/697 |
| 4,771,153 | 9/1988 | Fukushima et al. | 219/709 |
| 4,777,336 | 10/1988 | Asmussen | 219/10.55 |
| 4,825,028 | 4/1989 | Smith | 219/10.55 |
| 4,843,202 | 6/1989 | Smith | 219/10.55 |
| 4,866,344 | 9/1989 | Ross et al. | 315/3.5 |
| 4,939,331 | 7/1990 | Berggren et al. | 210/10.55 |
| 5,033,478 | 7/1991 | Kikuchi et al. | 219/717 |
| 5,241,040 | 8/1993 | Cuomo et al. | 528/353 |
| 5,321,222 | 6/1994 | Bible et al. | 219/761 |

OTHER PUBLICATIONS

MacKay, B, A., et al., "Frequency Agile Sources for Microwave Ovens", *Journal of Microwave Power*, vol. 14(1, 1979, pp. 63–76.

Swain, B., "Microwave Sintering of Ceramics", *Advanced Materials & Processes Incorporating Metal Progress*, Sep., 1988, reprinted.

Gewartowski, J. W., "Traveling–Wave Tube", *McGraw–Hill Encyclopedia of Science and Technology*, vol. 18, 16th Edition, 1987, pp. 509–511.

El–Sayed, E. M., et al., "Use of Sheath Helix Slow–Wave Structure as an Applicator in Microwave Heating Systems", *Journal of Microwave Power*, 16(3&4), 1981, pp. 283–288.

Lewis, D. A., et al., "Accelerated Imidazation Reactions Using Microwave Radiation", *J. Polymer Sci.: Part A: Polymer Chem.*, vol. 30, 1992, pp. 1647–1653.

Lauf, R. J., et al., *Polymer Curing in a Variable Frequency Microwave Oven*, 28th Microwave Power Symposium, Montreal, Canada, Jul. 12–214, 1993.

*Primary Examiner*—Philip H. Leung
*Attorney, Agent, or Firm*—Jeffrey N. Cutler; J. M. Spicer; H. W. Adams

[57] ABSTRACT

A variable frequency microwave heating apparatus (10) designed to allow modulation of the frequency of the microwaves introduced into a furnace cavity (34) for testing or other selected applications. The variable frequency heating apparatus (10) is used in the method of the present invention to monitor the resonant processing frequency within the furnace cavity (34) depending upon the material, including the state thereof, from which the workpiece (36) is fabricated. The variable frequency microwave heating apparatus (10) includes a microwave signal generator (12) and a high-power microwave amplifier (20) or a microwave voltage-controlled oscillator (14). A power supply (22) is provided for operation of the high-power microwave oscillator (14) or microwave amplifier (20). A directional coupler (24) is provided for detecting the direction and amplitude of signals incident upon and reflected from the microwave cavity (34). A first power meter (30) is provided for measuring the power delivered to the microwave furnace (32). A second power meter (26) detects the magnitude of reflected power. Reflected power is dissipated in the reflected power load (28).

37 Claims, 7 Drawing Sheets

APPARATUS AND METHOD FOR MICROWAVE PROCESSING OF MATERIALS

This invention was made with Government support under Contract No. DE-AC05-84OR21400 awarded by the U.S. Department of Energy to Martin Marietta Energy Systems, Inc. and the Government has certain rights in this invention.

This application in part discloses and claims subject matter disclosed in earlier filed pending applications, Ser. No. 08/219,098 filed on Mar. 29, 1994, now abandoned and Ser. No. 08/221,188 filed on Mar. 31, 1994, both of which disclose and claim subject matter disclosed in an earlier file application, Ser. No. 07/792,103 filed on Nov. 14, 1991, which issued as U.S. Pat. No. 5,321,222 on Jun. 14, 1994, which disclosed subject matter invented by at least one inventor of the present invention.

TECHNICAL FIELD

This invention relates to the field of microwave radiation. More specifically, this invention relates to a microwave furnace having the capability of selectively varying the frequency and power of the microwave source.

BACKGROUND ART

In the field of microwave radiation, it is well known that microwave furnaces are typically constructed with a fixed operating frequency. It has long been known that the interactions of various materials with microwaves are frequency dependent. These interactions may include curing rubber and sintering ceramics. It is therefore desirable to have a microwave furnace that can be operated over a broad frequency range.

Most microwave sources have a very narrow bandwidth because they employ a resonant cavity. Microwave ovens constructed for home use are provided with a magnetron which operates at 2.45 GigaHertz (GHz), which is an efficient frequency for heating water. Due to the coupling ability of a 2.45 GHz microwave to water, these ovens are used for cooking foods, drying, and other purposes wherein the principal material to be acted upon is water. However, it is well known that frequencies in this range are not suitable in all situations, such as with heating plasmas, sintering materials such as silica, and preparing films such as diamond films.

The use of frequency sweeping over a wide range as a means of mode stirring has important implications for the use of microwave power to sterilize medical equipment or contaminated wastes. In such uses it is crucial to eliminate "dead" areas in the cavity wherein sufficient power may not be received in order for complete sterilization. Electronic frequency sweeping may be performed at a high rate of speed, thereby creating a much more uniform time-averaged power density throughout the furnace cavity. The desired frequency sweeping may be accomplished through the use of a variety of microwave electron devices. A helix traveling wave tube (TWT), for example, allows the sweeping to cover a broad bandwidth (e.g., 2 to 8 GHz) compared to devices such as the voltage tunable magnetron (2.45±0.05 GHz). Other devices have other characteristic bandwidths as will be disclosed hereinafter.

Further, fixed-frequency microwave ovens typically found in the home are known to have cold spots and hot spots. Such phenomena are attributed to the ratio of the wavelength to the size of the microwave cavity. With a relatively low frequency microwave introduced into a small cavity, standing waves occur and thus the microwave power does not uniformly fill all of the space within the cavity, and the unaffected regions are not heated. In the extreme case, the oven cavity becomes practically a "single-mode" cavity.

Attempts have been made at mode stirring, or randomly deflecting the microwave "beam", in order to break up the standing modes and thereby fill the cavity with the microwave radiation. One such attempt is the addition of rotating fan blades at the beam entrance of the cavity.

Another method used to overcome the adverse effects of standing waves is to intentionally create a standing wave within a single-mode cavity such that the workpiece may be placed at the location determined to have the highest power (the hot spot). Thus, only the portion of the cavity in which the standing wave is most concentrated will be used.

It has been shown that the sintering behavior of various materials improves at higher frequencies, although the exact reasons are not known. However, existing state-of-the-art technology has made difficult the task of conducting a series of identical sintering experiments in which only the frequency is changed. This is due in large part to the fact that each microwave source is connected to a different furnace cavity. It is well known that the geometry of the furnace cavity is a parameter which must be considered in such experiments.

Furnaces incorporating gyrotron oscillators to produce fixed-frequency microwaves at 28 GHz have been reported in the literature. The gyrotron furnaces are capable of sintering some materials more efficiently than those ovens provided with the 2.45 GHz magnetrons. The gyrotron furnaces have specific applications in sintering materials such as ceramics. However, 28 GHz is not an efficient frequency with which to sinter all materials. It is desired to determine the most efficient frequencies to apply to a given material in a furnace with a cavity having a selected configuration.

The frequency for most efficient processing may vary for a given material as the heating process occurs. As a material changes phases, a varied frequency may be required. Thus, it may be desired to have the capability of varying the frequency in the heating process, allowing the tester to begin heating the specimen at one frequency and then change the frequency to maintain good coupling as the temperature rises. This may also be desirable when heating composite materials, where the varying materials efficiently react at different frequencies.

Other devices have been produced to change the parameters of the heating process of selected materials. Typical of the art are those devices disclosed in the following U.S. Patents:

| U.S. Pat. No. | Inventor(s) | Issue Date |
| --- | --- | --- |
| 3,611,135 | D. L. Margerum | Oct 5, 1971 |
| 4,144,468 | G. Mourier | Mar 13, 1979 |
| 4,196,332 | A. MacKay B, et al. | Apr 1, 1980 |
| 4,340,796 | M. Yamaguchi, et al. | Jul 20, 1982 |
| 4,415,789 | T. Nobue, et al. | Nov 15, 1983 |
| 4,504,718 | H. Okatsuka, et al. | Mar 12, 1985 |
| 4,593,167 | O. K. Nilssen | Jun 3, 1986 |
| 4,777,336 | J. Asmussen | Oct 11, 1988 |
| 4,825,028 | P. H. Smith | Apr 25, 1989 |
| 4,843,202 | P. H. Smith, et al. | Jun 27, 1989 |
| 4,866,344 | R. I. Ross, et al. | Sep 12, 1989 |
| 4,939,331 | B. Berggren, et al. | Jul 3, 1990 |

The subject matter disclosed by MacKay ('332) is further discussed in an article authored by MacKay B, et al., entitled "Frequency Agile Sources for Microwave Ovens", *Journal of Microwave Power*, 14(1), 1979. However, a microwave furnace having a wide frequency range has not been disclosed, except in the above-referenced co-pending application Ser. No. 07/792,103.

However, none of the prior art references disclosed above, including the co-pending application Ser. No. 07/792,103, explicitly recognizes the diagnostic value of simultaneously providing multiple microwave frequencies for significantly enhancing the efficiency of microwave processing and achieving a high degree of processing control by extracting useful information from the multiple microwave frequencies.

Therefore, it is an object of this invention to provide a microwave-based materials processing system which can operate at a plurality of frequencies simultaneously.

Another object of the present invention is to provide a microwave-based processing system from which diagnostic information is obtained using the incident and reflected microwave signals in a microwave processing cavity.

Still another object of the present invention is to provide such a microwave-based processing system wherein the processing is controlled and monitored from the diagnostic information obtained using the incident and reflected microwave signals.

Yet another object of the present invention is to provide a method for microwave-based processing in which information obtained from the incident and reflected microwave signals at a plurality of frequencies from a microwave processing system is utilized to provide feedback to control or monitor the processing operation.

DISCLOSURE OF THE INVENTION

Other objects and advantages will be accomplished by the present invention which is designed to allow modulation of the frequency of the microwaves introduced into a furnace cavity for testing or other selected applications. Some applicable processes include heat treatment, sterilization, sintering, plasma processing, ore processing, polymerization, etching, and preparing films. The method of the present invention is designed to allow for the monitoring of a microwave process to optimize the resonant frequency at which the target material is processed.

A microwave signal generator is provided for generating a low-power microwave signal for input to the microwave amplifier. The signal generator of the preferred embodiment is able to sweep a given range of frequencies, operate in pulse mode, modulate the frequency of the microwave signal, and produce various complex waveforms. The microwave signal generator of the preferred embodiment may be operated in the pulse mode using an internal pulse generator or it can be pulsed externally. An internal modulator is provided for wide band modulation. The internal modulator may operate in the AM mode or in the FM mode.

A voltage controller serves to modulate the amplitude of the microwave voltage-controlled oscillator. The microwave voltage-controlled oscillator may be used in lieu of the microwave signal generator to modify the frequency and amplitude of the generated microwave.

A first amplifier may be provided to amplify the magnitude of the signal output from the microwave signal generator or the microwave voltage-controlled oscillator. The first amplifier of the preferred embodiment is voltage-controlled, therefore the gain is adjustable such that the magnitude of the output is selectable by the operator.

A second amplifier is provided for processing the signal output by the first amplifier, or from the microwave signal generator or the microwave voltage-controlled oscillator when a first amplifier is not employed. The second amplifier outputs a high-power microwave signal to the furnace cavity and to which the workpiece is subjected. In the preferred embodiment, the second amplifier may be any one of a helix traveling-wave tube (TWT), a coupled-cavity TWT, a ring-loop TWT, a ring-bar TWT, a klystron, a twystron, or a gyrotron. These devices include an internal cooling device designed to dissipate the heat collected by the amplifier during normal operation.

In another embodiment of the invention, the oscillator and first and second amplifiers may be replaced with a frequency-agile coaxial magnetron, the frequency of which can be tuned manually, mechanically, or electrically.

A power supply is provided for the operation of the second amplifier. In the preferred embodiment, the power supply is a direct current source consisting of a precision-regulated helix power supply and a less-regulated collector high voltage supply.

A directional coupler is provided for detecting the direction of a signal and further directing the signal depending on the detected direction. A signal received from the microwave source is directed toward the microwave cavity. A signal received from the direction of the microwave cavity is directed toward a reflected power load. The directional coupler thus provides a means whereby reflected power is diverted away from the microwave source in order to protect the microwave source from power unabsorbed by the workpiece. The directional coupler of the preferred embodiment is water-cooled for the dissipation of heat collected through the transmission of power from the microwave source and the reflection of power from the microwave cavity.

A first power meter is provided for measuring the power delivered to the microwave cavity. The first power meter is used in conjunction with a second power meter positioned to measure reflected power from the microwave cavity in order to monitor the efficiency of the microwave cavity and to insure that reflected power is dissipated in the reflected power load and not by the second amplifier.

The reflected power load may also be used to test the functionality of the system by removing all workpieces from the furnace cavity, thus directing the entire signal from the second amplifier into the reflected power load. Comparisons can be made of the power received by the reflected power load and the power delivered from the second amplifier to determine any system losses.

The magnitude of the reflected power is detected by the second power meter. This magnitude may be used to determine the efficiency of the instant frequency of the microwave introduced into the microwave cavity. A lower reflected power will indicate a more efficient operating frequency due to the higher absorption rate of the selected workpiece.

A tapered transition may be provided to enhance the efficiency with which the broadband microwave energy is coupled into the microwave cavity. By acting as an impedance transformer between the transmission line and the microwave cavity, this transition increases the percentage power coupled into the cavity. In addition, for applications in which the microwave energy must be coupled into a cavity in which reactive gases are present, this tapered transition provides a means of reducing the power density of the microwave energy at the interface between the window and reactive gases, thereby preventing formation of plasma discharges at the input window.

The various embodiments of microwave heating apparatuses as heretofore described are used in the method of the present invention. In the method of the present invention, the second amplifier is first operated at a low power level while the microwave cavity remains empty. The second amplifier is used to sweep the empty microwave processing cavity over the frequency range to be studied. The power reflected through the directional coupler is then measured to determine a percent of power transmitted to the cavity and reflected back toward the second amplifier. Measurements are taken to determine the reflected power as a function of frequency, from which the resonant modes of the microwave processing cavity are quickly and accurately determined. By comparing reflected power at the various cavity modes, the optimum cavity mode can be immediately identified.

The sample to be processed is then placed into the microwave cavity. The frequency is swept again at a low power level. The presence of the sample in the microwave cavity has the effect of shifting the mode pattern down in frequency. Additionally, new modes become apparent. The initial resonance frequency at which the sample is to be processed is determined as that frequency at which the most efficient mode occurs. The output power is then increased to begin the microwave processing. Under high power conditions, the gas or sample can exhibit far different properties than when the system is cold. These changed conditions can affect the mode pattern within the cavity, causing the frequency of the desired resonant mode to drift. Thus, monitoring such reflected power yields the ability to maintain optimum coupling. In the method of the present invention, the percentage reflected power is monitored over a narrow frequency range near the desired mode, thus allowing the efficiency of the process to be maintained at a maximum.

Making use of the capability of the TWT to handle multiple, simultaneous signals at different frequencies, while driving the plasma or heating the sample at a high power level using the initial resonant frequency of choice, the microwave chamber is simultaneously probed with a low-power signal over the entire frequency range. The percentage reflected power versus frequency is then determined for this low-power, probe signal. The high-power mode spectrum is then compared with the low-power mode spectrum, which is ground state. A comparison of the mode spectrums illustrates the effectiveness of the resonant frequency of choice. Thus, a more appropriate, high-power resonant frequency can be chosen. This method will in some instances involve the discovery and use of a mode which is non-existent under the initial low-power condition or which might not appear optimum under the low-power testing.

While continuing to drive a mode selected using the initial low-power criteria, a second resonant frequency characteristic of the hot plasma or sample may be simultaneously driven at high power. Thus, the processing of the sample may be performed at two modes simultaneously, as opposed to one mode being used to process with the other used strictly for monitoring.

In a microwave-associated deposition process, for deposited materials such as diamond which have a resonance within the frequency range of the TWT, a low-power frequency probe can be used as a direct sensor to monitor the film growth. Simultaneously, a high-power signal is used to procure the deposition. By correlating the strength of the absorption at that frequency with film thickness, in situ sensing for a degree of intelligent process control is achieved.

Alternatively to the direct sensing of the film growth as indicated, indirect methods may also be used. Such instances occur especially when the optimum resonant frequency for the film is outside the frequency range of the second amplifier. One indirect technique for sensing film deposition includes placing a sample of a dielectric material in the microwave chamber such that the material has a resonant frequency within the frequency range of the second amplifier. As the dielectric material is coated, the change in the resonant frequency is used as a measure of the coating thickness.

In another method of indirectly sensing film deposition, a piezo-electric crystal is used. The piezo-electric crystal has a resonant frequency which changes as the deposited film thickness increases. The crystal is excited directly by the second amplifier or by an external electronic means, with the response being measured during the low-power microwave sweep.

The values of reflected power at each of n frequencies can be expressed as a vector of dimension n. Any number of such vectors, or signatures, are measurable, with each representing a different set of process conditions. These signatures are then used to train a neural network or other pattern classifier. The pattern classifier monitors the process in real time and provides a degree of active control by automatically adjusting process parameters to maintain those conditions which yield the signature characteristic of the desired operating regime.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A variable frequency microwave heating apparatus incorporating various features of the present invention is illustrated generally at 10 in the figures. The microwave heating apparatus 10 is employed to perform the microwave processing method of the present invention. The microwave heating apparatus 10 is designed to allow modulation of the frequency of the microwaves introduced into a microwave cavity for testing or other selected applications. Such modulation is useful in testing procedures to determine the most efficient frequencies at which a particular material may be processed. Frequency modulation is also useful as a method of mode stirring as a means to create a more uniform power distribution in a relatively small furnace cavity.

Frequency modulation testing is useful, not only in the determination of efficient sintering frequencies of a selected material, but also in determining the most efficient sintering frequencies for the individual phases of a selected material. In the same vein, frequency modulation is useful in the processing of a material undergoing phase changes, wherein each phase of the material couples more efficiently to a frequency varied from that of other phases. Further, frequency modulation is useful when processing composite materials wherein each component couples to a different frequency than other components.

Figure 1:
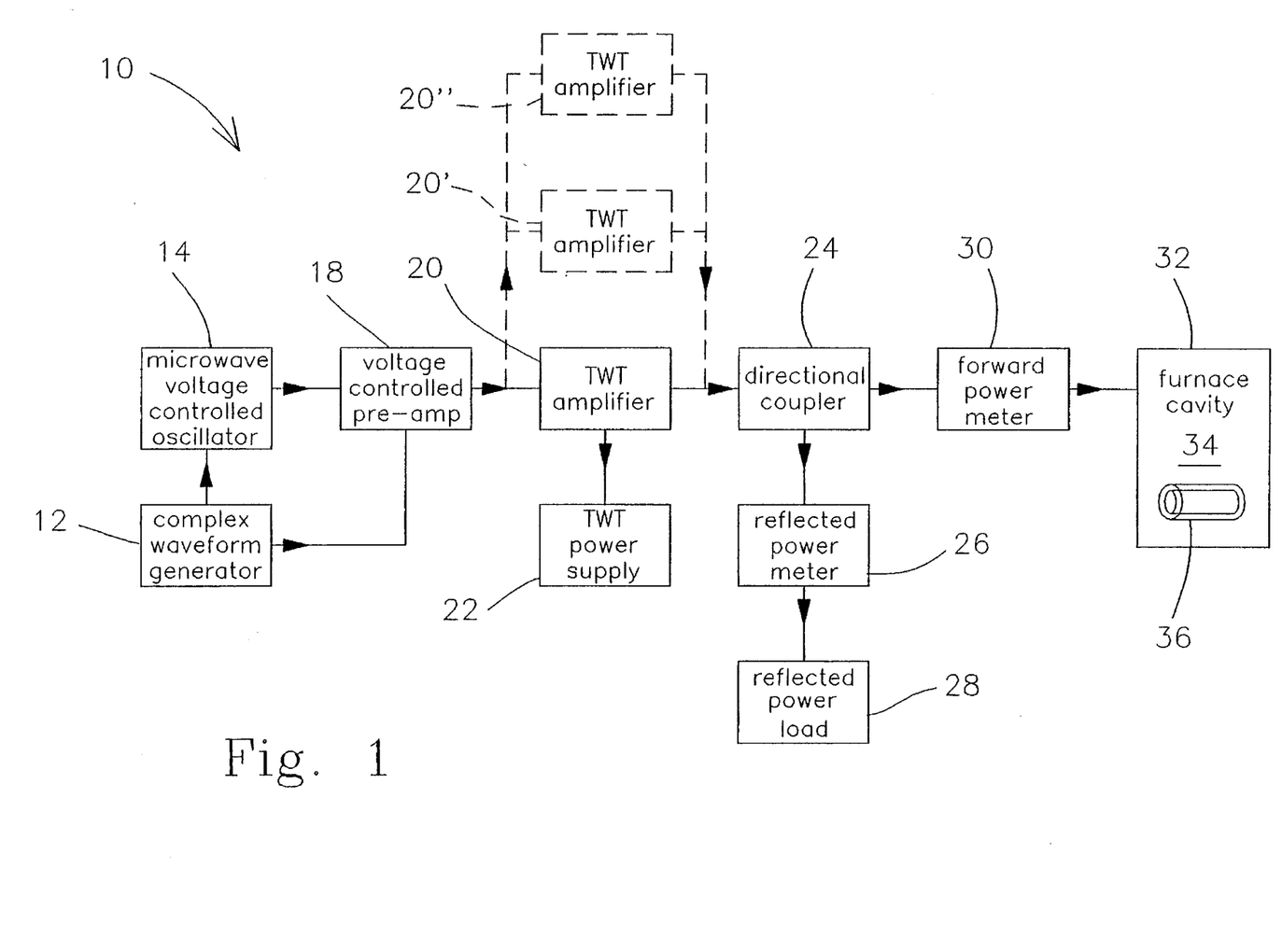
FIG. 1 is a schematic diagram of the preferred embodiment of the variable frequency microwave furnace system of the present invention.

FIG. 1 illustrates schematically the preferred embodiment of the variable frequency microwave heating apparatus 10 of the present invention, wherein a selected workpiece 36 is to be processed. Applicable processes include, but are not limited to, heat treatment, sterilization, sintering, plasma processing, ore processing, polymerization, etching, and preparing films. It will be understood that the term "workpiece" as used within the present disclosure refers to a selected material or composition of materials. The term "workpiece" may further include such selected material or composition of materials wherein at least one of the materials is undergoing at least one phase change and is, therefore, in more than one phase at a given time.

A microwave voltage-controlled oscillator 14 is provided for generating a low-power microwave signal for input to the microwave furnace 32. A complex waveform generator 12 provides the controlling voltage to the voltage-controlled oscillator 14, causing the voltage-controlled oscillator to sweep a given range of frequencies, operate in pulse mode, modulate the frequency of the microwave signal, and produce various complex waveforms.

The complex waveform generator 12 of the preferred embodiment may be operated in the pulse mode using an internal pulse generator or it can be pulsed externally. An internal modulator is provided for wide band modulation. The internal modulator may operate in the AM mode or in the FM mode.

The microwave voltage controlled oscillator 14 generates a microwave signal of a frequency determined by the voltage applied to the voltage controlled oscillator 14 by the waveform generator 12. It may be desirable to modulate the frequency of the microwave as a selected material may efficiently couple with a particular frequency and require a high voltage level, whereas a second material may couple more efficiently at a different frequency and at a lower, or higher, voltage level. Thus, the microwave voltage-controlled oscillator 14 may be used in combination with the complex waveform generator 12 to modify the frequency of the generated microwave.

It will be seen that the number of possible combinations of frequencies and power levels is numerous. Further, with the ability of such frequency and amplitude modulation, it will be seen that the processing of a workpiece 36 may be accomplished by alternating the frequency and amplitude of the microwave in order to achieve maximum processing efficiency. The modulations may occur at such rates as to be undetectable by the workpiece 36, yet creating maximum processing efficiency for each material and material phase.

A first amplifier 18 may be provided to amplify the power of the signal output from the microwave voltage-controlled oscillator 14. The first amplifier 18 of the preferred embodiment is voltage-controlled, therefore the gain is adjustable such that the amplitude of the output is selectable by the operator. During operation of the variable frequency microwave heating apparatus 10, the operator may instantaneously adjust the first amplifier 18 such that the amplitude of the microwave may be correspondingly adjusted. The control voltage for the first amplifier 18 can also be supplied by the complex waveform generator 12, allowing the amplitude of the signal output to be modulated in any desired way.

A second amplifier 20 is provided for processing the signal output by the first amplifier 18, or from the microwave voltage-controlled oscillator 14 when a first amplifier 18 is not employed. The second amplifier 20 outputs the microwave signal input to the multi-mode furnace cavity 34 and to which the workpiece 36 is subjected. In the preferred embodiments, the second amplifier 20 may be any one of a helix traveling-wave tube (TWT), a coupled-cavity TWT, a ring-loop TWT, a ring-bar TWT, a klystron, a twystron, or a gyrotron.

The TWT 20 is a linear beam device wherein a signal having a selected frequency and wave form is amplified and output. The TWT 20 has the capability of amplifying any selected frequency or waveform within a range or bandwidth defined by the configuration of the TWT 20. Particularly, the physical geometry of the TWT 20 limits the frequency range, such that as a high limit is reached, a counteracting signal is encountered, giving the appearance of a second wave.

In order to achieve a frequency higher or lower than that capable of the TWT 20 incorporated in a particular configuration, the internal geometry of the TWT 20, especially the pitch of the helix 40, is changed. In the latter mentioned TWT 20, a new frequency range will be defined. It will be seen, therefore, that a variety of configurations of TWT's 20 is possible such that a broader range of frequencies may be achieved. To this end, the TWT's 20 of the present invention are designed to be selectively removable from the variable frequency microwave heating apparatus 10 and interchangeable with other such TWT's 20. Hence, a single microwave voltage-controlled oscillator 14, microwave furnace 32, and microwave furnace cavity 34 may be used with a variety of TWT's 20, thus allowing a series of identical tests to be performed with the microwave frequency being substantially the only variable. One TWT 20 may define a frequency range of 4 GHz to 8 GHz, while another TWT 20' defines a frequency range of 8 GHz to 16 GHz. Still another TWT 20" may define a third frequency range. Interchanging TWT 20 with TWT 20' defines a total range from 4 GHz to 16 GHz. One such TWT 20 defining a range of 4 GHz to 8 GHz is the Model T-1096 G/H Band Helix TWT manufactured by Microwave Laboratories, Inc. Specifications for the Model T-1096 are listed in Table 1.

As earlier mentioned, the traveling wave tube 20 is a linear beam device characterized by a traveling electric field which continuously extracts energy longitudinally along the path of an electron beam. As shown graphically in FIG. 3 and diagrammatically in FIG. 4, a typical TWT 20 is constructed with an electron gun assembly 44 attached to the first end 46 of a single-wire helix 40. The gun assembly 44 produces a focused beam of electrons which is directed through the center of the helix 40. Tapered carbon attenuators 50, integral to the helix 40, serve as directional couplers preventing reflections from passing back to the tube input. Rf input and output windings 52,54 are placed at the cathode and collector ends 46,48, respectively, of the helix 40.

TABLE 1

Specifications for the T-1096 G/H Band Helix TWT

|  | Min | Max | Typ | Unit |
| --- | --- | --- | --- | --- |
| RF Performance |  |  |  |  |
| Power Output | 63.0 | 65.0 | 63.5 | dbm |
| Frequency Range | 4.0 | 8.0 |  | Ghz |
| Harmonic Content | — | −3.0 | −6.0 | dbc |
| Gain at rated Power | 25.0 | 37.0 | 30.0 | db |
| Electrical Parameters |  |  |  |  |
| Helix Voltage | −8.0 | −9.0 | −8.4 | kV |
| Anode Voltage (WRTC) | 0.0 | +9.0 | — | kV |
| Collector Voltage (WRTC) | +6.2 | +6.8 | +6.5 | kV |
| Filament Voltage (WRTC) | 12.4 | 13.2 | 12.8 | V |
| Solenoid Voltage | 35.0 | 57.0 | 48.0 | V |
| Vac-Ion Voltage | +3.5 | +5.0 | +3.5 | kV |
| Helix Current | — | 25.0 | 15.0 | mA |
| Anode Current | — | 5.0 | — | mA |
| Collector Current | 0.9 | 1.8 | 1.2 | A |
| Filament Current | 1.2 | 2.0 | 1.4 | A |
| Solenoid Current | 21.0 | 26.0 | 25.0 | A |
| Vac-Ion Current | — | 0.01 | — | mA |
| Prime Power | — | 10.7 | 9.2 | kW |

Figure 3:
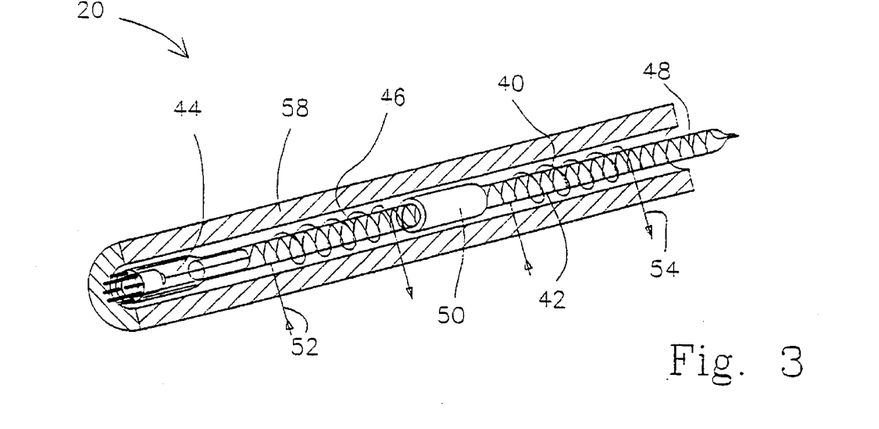
FIG. 3 is a perspective view of the traveling wave tube, shown partially in section, which is incorporated in the variable frequency microwave furnace system of the present invention.
Figure 4:
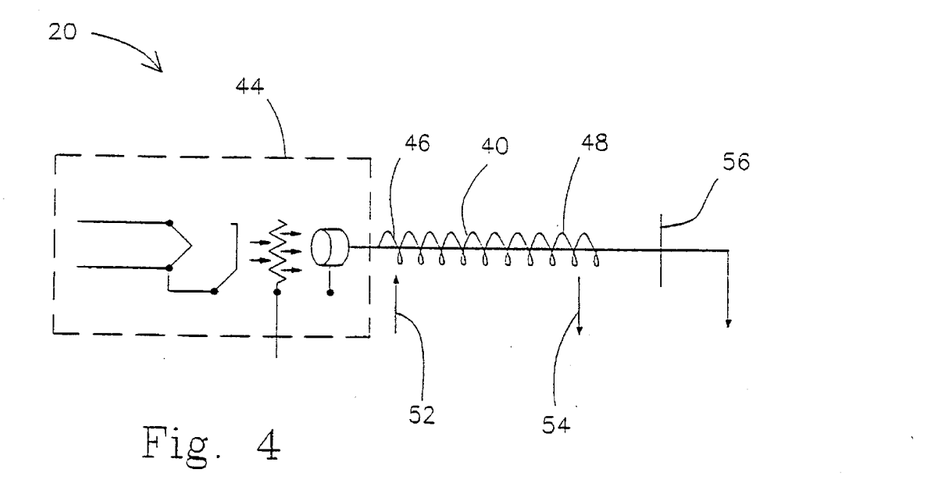
FIG. 4 is a schematic diagram of a traveling wave tube which is incorporated in the variable frequency microwave furnace system of the present invention.

A collector 56, charged positively, is located at the second end 48 of the helix 40. The collector 56 provides the source of energy for the operation of the TWT 20. Beam focusing and containment magnets 58 surround the entire assembly of the TWT 20.

Electrons traversing the axis of the helix 40 interact with the rf wave propagating along the helix 40 such that energy is transferred from the electron beam to the rf wave. This interaction is continuous and cumulative, increasing the amplitude of the rf signal as it propagates along the helix 40.

Figure 5:
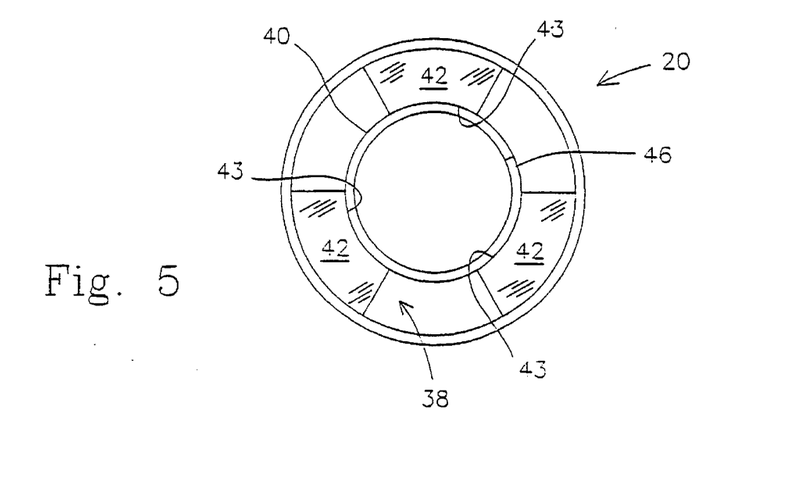
FIG. 5 is an end view of the traveling wave tube, shown in cross-section, which is incorporated in the variable frequency microwave furnace system of the present invention.

The second amplifier 20 of the preferred embodiment includes an internal cooling device 38 designed to dissipate the heat collected by the second amplifier 20 during normal operation. Particularly, in the event of a helix TWT, the helix of the TWT 20 and the helix supports 42 are fabricated from selected materials in order to perform this function. The helix TWT 20 of the preferred embodiment is provided with a helix 40 fabricated from flat copper wire. A plurality of retainers 42 are positioned in parallel fashion about the longitudinal axis of the helix TWT 20 about which the copper wire is wrapped, the retainers 42 serving to retain the helix 40 defined by the copper wire and further to dissipate the heat transferred to the copper wire during operation of the helix TWT 20. In the preferred embodiment the retainers 42 define a cross-section with at least one substantially flat side 43, the flat side 43 being in substantial contact with the copper wire.

Further, the retainers 42 of the preferred embodiment are fabricated from beryllium oxide. It is known that even though beryllium oxide is an electrical insulator, it is also an excellent conductor of heat. The copper wire defining a flat cross-section and substantially contacting the flat side 43 of the retainers 42 provides for an efficient and thorough dissipation of the heat transferred to the copper wire, thus providing a cooling device 38 for the internal portion of the helix TWT 20 and hence extending the life of the helix TWT 20.

A power supply 22 is provided for the operation of the second amplifier 20. Though not individually depicted in the figures, the preferred power supply 22 is a direct current source consisting of a precision-regulated cathode power supply and a less-regulated collector high voltage supply. Output regulation for the cathode supply is accomplished through a tube regulator circuit using a tetrode tube. One such tube is the Eimac 4PR400A tube. Regulation for the collector supply and the cathode raw supply is accomplished with an electromechanical regulator. The collector supply of the preferred embodiment is provided with two switch plates for the selection of output ranges. A typical power supply 22 used to power the second amplifier 20 is the Universal Voltronics Model BRE-15-140-ML High Voltage Power Supply. The specifications of the Universal Voltronics power supply are listed in Table 2.

Figure 2:
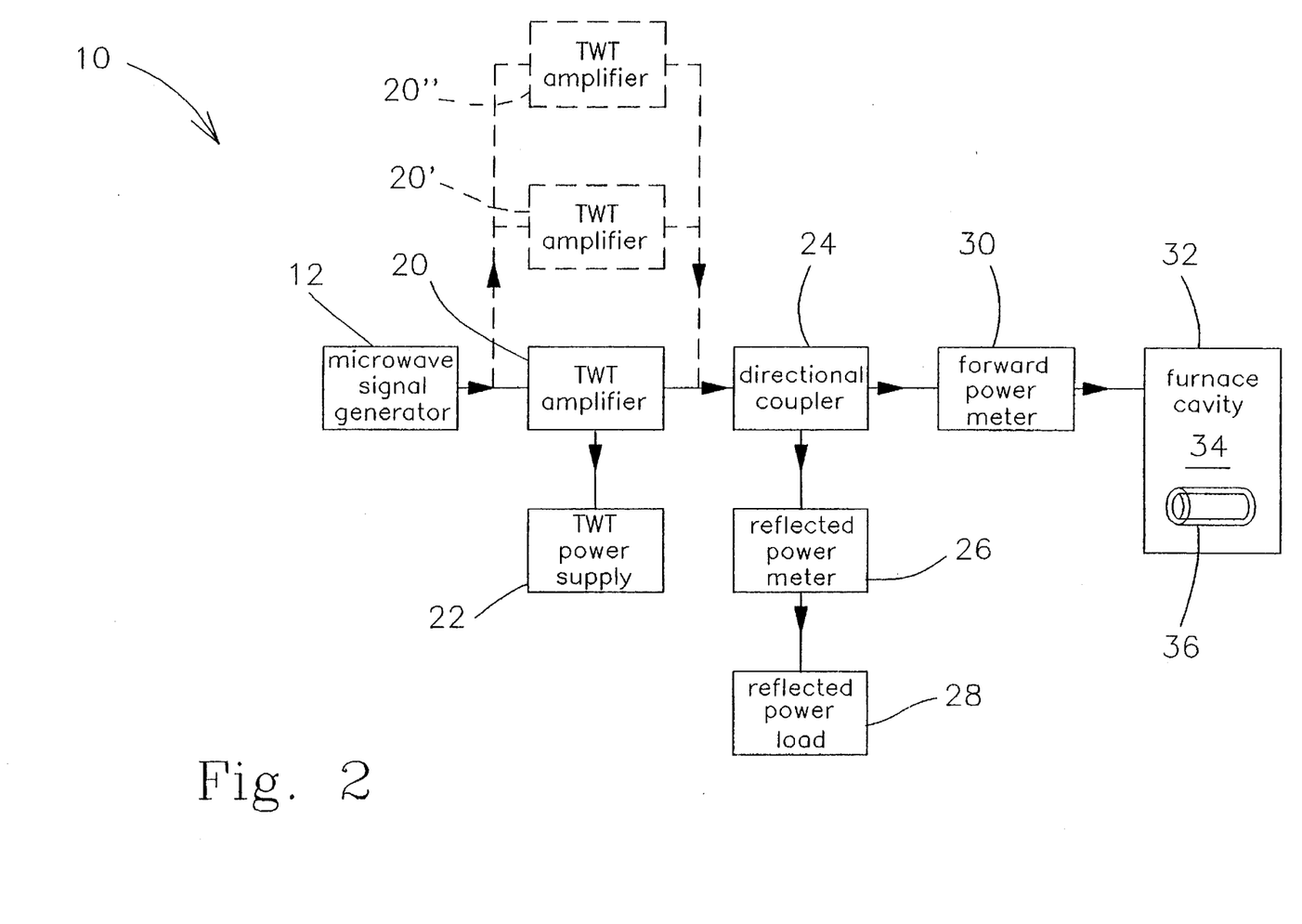
FIG. 2 illustrates a schematic diagram of another preferred embodiment of the variable frequency microwave furnace system of the present invention.

As shown in FIG. 2, the variable frequency microwave heating apparatus 10 may be operated without the use of a microwave voltage-controlled oscillator 14 and a first amplifier 18. In this embodiment, the microwave signal generator 12 is employed independently to generate a selected signal and is output directly without further modification. One such microwave signal generator 12 is the Model 6724 signal generator manufactured by Wiltron. In this embodiment, the amplitude modulation is performed within the power supply 22 of the second amplifier 20.

Referring to FIGS. 1 and 2, a directional coupler 24 is provided for detecting the direction of a signal and further directing the signal depending on the detected direction. The directional coupler 24 is provided proximate the collector end of the second amplifier 32. A signal received from the second amplifier 20 is directed toward the microwave cavity 32. A signal received from the direction of the microwave cavity 32 is directed toward a reflected power load 28. The directional coupler 24 thus provides a means

TABLE 2

Electrical Specifications for the Universal Voltronics Model BRE-15-140-ML Power Supply

| HELIX SUPPLY | |
| --- | --- |
| Output Voltage | 500 V–15 KVDC |
| Output Current | 140 mADC |
| Polarity | Negative Output |
| Ripple | .01% rms @ 15 KVDC, 140 mADC |
| Regulation, load | +0.1% from no load to full load @ maximum output |
| Regulation, line | +0.1% for line voltage from 190–230 VAC @ maximum output |
| COLLECTOR SUPPLY | |
| Output Voltage and Current | |
| Mode I (parallel) | 0–5 KV @ 4000 mA |
| Mode II (series) | 0–10 KV @ 2000 mA |

TABLE 2-continued

Electrical Specifications for the Universal
Voltronics Model BRE-15-140-ML Power Supply

| Polarity | Positive output, negative tied to helix supply |
|---|---|
| Ripple | 3% rms @ 10 KVDC, 2000 mA |
| Regulation, load | +2% from no load to full load @ maximum output |
| Regulation, line | +2% for line voltage from 190–230 VAC @ maximum output |
| CROWBAR (connected across the collector supply) | |
| Response Time | 5 microseconds |
| SYSTEM | |
| Input Voltage | 190–230 VAC phase to phase, 3 phase, 60 Hz, 30 KVA |
| Power Connection | 5 position terminal board (3 phase neutral ground) |
| Output Connectors | 10–32 studs for collector, cathode & helix |
| Controls Connector | 90 pin Elco connector | whereby a reflected signal—that is, power not absorbed by the workpiece 36 and therefore directed back toward the source 20—is diverted away from the second amplifier 20 in order to protect the second amplifier 20 from power unabsorbed by the workpiece 36. The reflected power load 28 of the preferred embodiment is water-cooled for the dissipation of heat collected through the reflection of power from the microwave cavity 32.

A first power meter 30 is provided for measuring the power delivered to the microwave cavity 32. The first power meter 30 is used in conjunction with a second power meter 26 positioned to measure reflected power from the microwave furnace 32 in order to monitor the efficiency of the microwave furnace 32 and to insure that reflected power is dissipated in the reflected power load 28 and not by the second amplifier 20.

The signal output by the second amplifier 20 is introduced into the microwave cavity 34 for absorption by the selected workpiece 36. Typically, the introduced signal is not completely absorbed by the workpiece 36 and is therefore reflected back toward the second amplifier 20, having no other path to follow.

The reflected signal reaches the directional coupler 24 and is there diverted toward the second power meter 26 and finally to the reflected power load 28. The reflected power is dissipated in the reflected power load 28, as previously mentioned, in an attempt to protect the longevity of the second amplifier 20. The reflected power load 28 may also be used to test the functionality of the system by removing all workpieces 36 from the furnace cavity 34, thus directing the entire load from the second amplifier 20 into the reflected power load 28. Comparisons can be made of the power received by the reflected power load 28 and the power delivered from the second amplifier 20 to determine any system losses.

The magnitude of the reflected power is detected by the second power meter 26. This magnitude may be used to determine the efficiency of the instant frequency of the microwave introduced into the microwave cavity 34. A lower reflected power will indicate a more efficient operating frequency due to the higher absorption rate of the selected workpiece 36.

Figure 6:
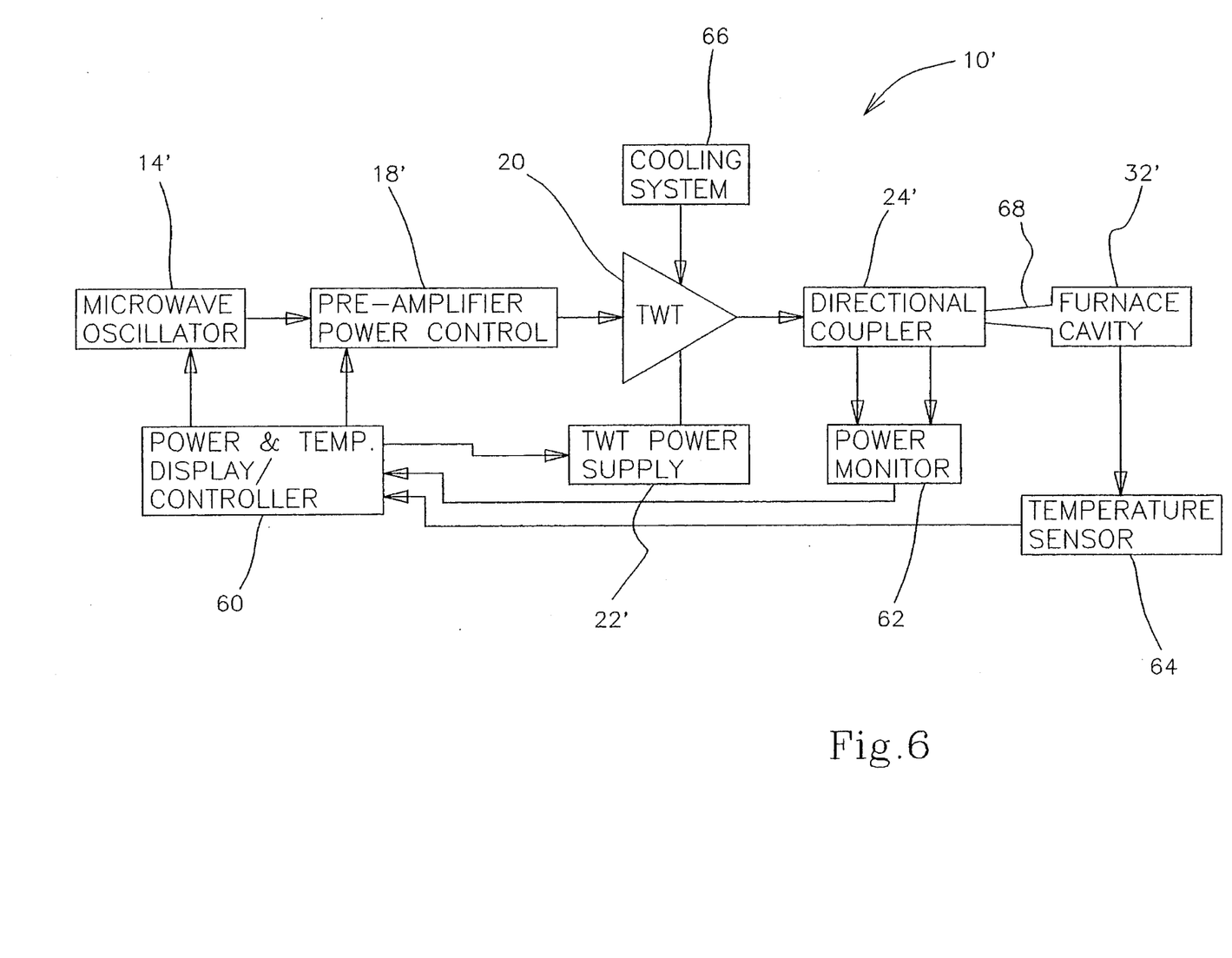
FIG. 6 illustrates a schematic diagram of another preferred embodiment of the variable frequency microwave heating apparatus of the present invention.

Illustrated in FIG. 6 is an alternate embodiment of the variable frequency microwave heating apparatus 10'. In this embodiment, a power and temperature display and controller 60 receives input from a power monitor 62 and a temperature sensor 64. The power monitor 62 receives input from the directional coupler 24' and serves the same basic functions as the reflected and forward power meters 26,30 incorporated in the previously described embodiment. The power and temperature display and controller 60 further serves to control the microwave oscillator 14', the pre-amplifier power control 18', and the TWT power supply 22'. A cooling system 66 is provided for cooling at least the TWT 20 during operation thereof.

A tapered waveguide coupler 68 may be provided to enhance the efficiency with which the broadband microwave energy is coupled into the microwave cavity. By acting as an impedance transformer between the transmission line from the directional coupler 24' and the microwave cavity 32', this transition increases the percentage power coupled into the microwave cavity 32'. In addition, for applications in which the microwave energy must be coupled into a microwave cavity 32' in which reactive gases are present, the tapered waveguide 68 provides a means of reducing the power density of the microwave energy at the interface between the microwave input window and reactive gases, thus preventing the formation of plasma discharges at the microwave input window.

The microwave heating apparatus 10 described above includes a helix TWT amplifier 20. However, it will be understood that many other microwave sources 20 may be used in accordance with other aspects of the present invention. Table 3 below gives typical characteristics of some other suitable microwave sources 20.

TABLE 3

Characteristics of Some Suitable Microwave Sources:

| Source Type | Frequency Range (GHz) | Bandwidth (%) | Peak Output Power (kW) | Average Output Power (kW) | Overall Eff. (%) |
|---|---|---|---|---|---|
| Ring-loop TWT | .5–20 | 5–15 | 1–20 | .05–.6 | 30–45 |
| Ring-bar TWT | .5–20 | 10–20 | 3–30 | .08–.9 | 30–45 |
| Coupled-cavity TWT | .5–300 | 5–15 | 50–5000 | 1–300 | 40–60 |
| Klystron | .5–70 | 5–8 | 100–8000 | 1–5000 | 40–70 |
| Crossed-field Amp | .5–20 | 15–40 | 100–3000 | 1–300 | 30–50 |

Figure 7:
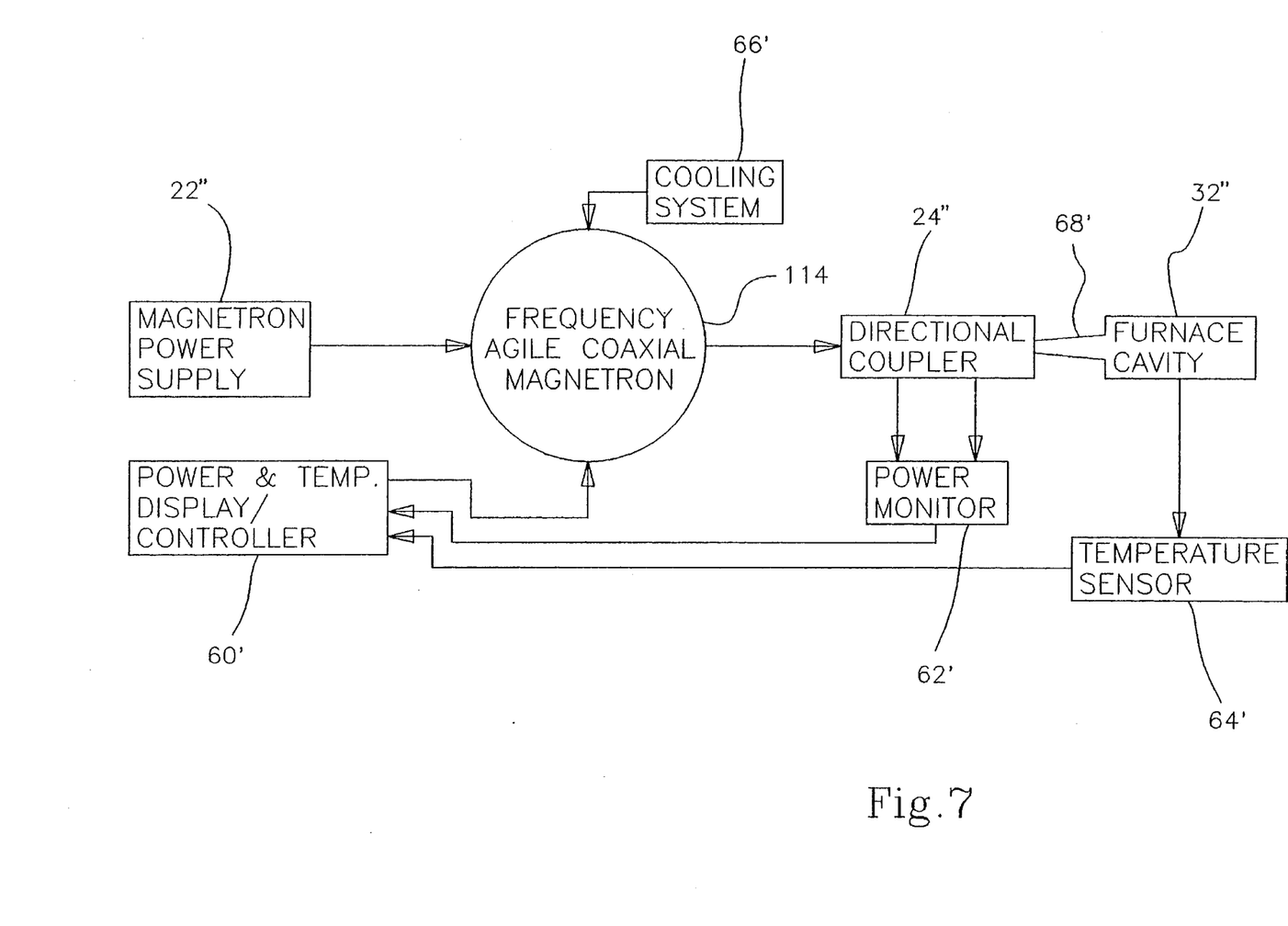
FIG. 7 illustrates a schematic diagram of another preferred embodiment of the variable frequency microwave heating apparatus of the present invention.

Illustrated in FIG. 7 is an alternate embodiment of the variable frequency microwave heating apparatus 10 of the present invention. In this alternate embodiment, a high-power oscillator 114 such as a frequency-agile coaxial magnetron is substituted for the microwave oscillator 14, the pre-amplifier power control 18 and the TWT 20 of the previously described embodiments. The magnetron 114 of the preferred embodiment has a usable bandwidth of at least 5% of its center frequency. The magnetron 114 is frequency-controlled either manually or, preferably, through a closed-loop, voltage-based feedback control system. In such a feedback control system, a low-level (0 to 10 V) signal is used to activate a servo-mechanism in the magnetron 114 which "tunes" the magnetron 114 from one frequency to another by precise repositioning of a plunger plate in the magnetron's coaxial cavity.

From the foregoing description, it will be recognized by those skilled in the art that a variable frequency microwave heating apparatus 10 offering advantages over the prior art has been provided. Specifically, the microwave heating apparatus 10 used in accordance with the present invention provides a means for adjusting the frequency of the microwaves introduced into a cavity 34 for sintering purposes, or as otherwise required. It will be seen that the microwave heating apparatus 10 is useful in testing the processing characteristics of selected materials with respect to microwave frequency. Such test will enable the design of a microwave furnace 32 with a microwave source which generates microwaves at the determined frequency.

It will further be seen that the microwave heating apparatus 10 is useful as a production tool in that the frequency of the microwaves may be varied for different materials or material phases. The frequency modulation may be performed during the operation of the microwave heating apparatus 10 in order to accommodate various materials and material phases. Further, the frequency modulation capability of the present invention serves as a method of mode stirring for creating a more uniform power distribution in relatively small microwave cavities 34.

The efficiency of the variable frequency microwave heating apparatus 10 has been displayed in various tests performed in the development process. Typical testing configurations and results have been described in the aforementioned co-pending application Ser. No. 07/792,103, which is incorporated herein by reference.

The various embodiments of microwave heating apparatuses 10 as heretofore described are used in the method of the present invention. For purposes of the present method, the second amplifier 20 of the preferred embodiment is capable of outputting two microwave signals simultaneously, with the first being a low-power signal and the second being a high-power signal. The low-power microwave signal is used in the method of the present invention as a diagnostic signal, while the high-power signal is used for processing the workpiece 36. Alternatively, the low-power and high-power signals may be derived from separate sources.

Figure 8:
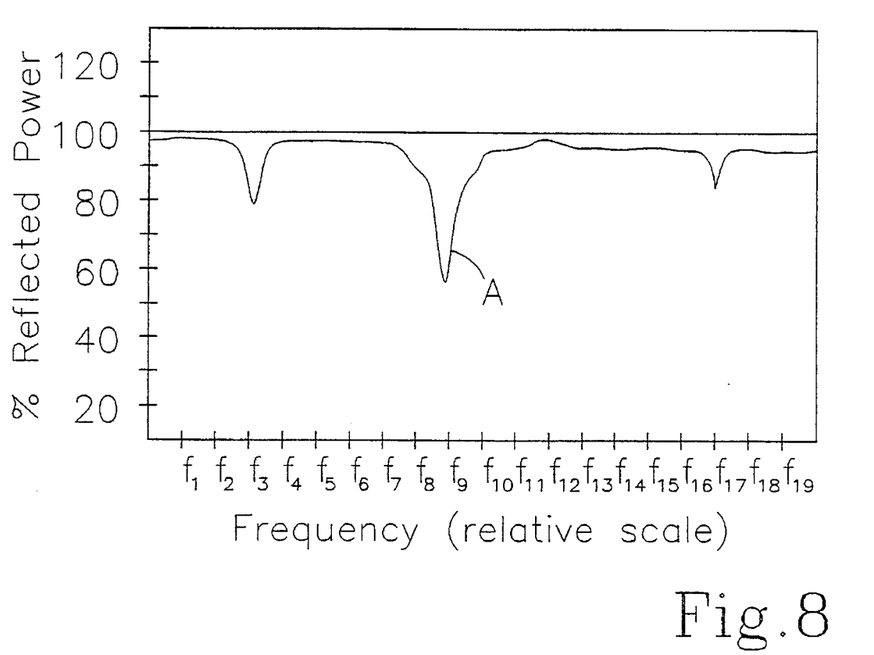
FIG. 8 is a graphical illustration of a mode pattern of an empty microwave cavity showing percentage reflected power versus frequency.

In the method of the present invention, the second amplifier 20 is first operated at a low power level while the microwave cavity 34 remains empty. In the case of the helix TWT 20, for example, the initial operating power level may be on the order of one to ten watts (1–10 W). In this case, the helix TWT 20 is used to sweep the empty microwave processing cavity 34 over the frequency range to be studied. The power reflected through the directional coupler 24 is then measured to determine a percent of power transmitted to the cavity 34 and reflected back toward the helix TWT 20. Measurements are taken to determine the reflected power as a function of frequency, from which the resonant modes of the microwave processing cavity 34 are quickly and accurately determined. Typical of these measurements are graphically illustrated in FIG. 8. Further, by comparing reflected power at the various cavity modes, the optimum cavity mode can be immediately identified, such as at A in FIG. 8. The optimum cavity mode is determined by the minimum percentage of reflected power, or the maximum percentage of power absorbed within the microwave cavity 34.

Figure 9:
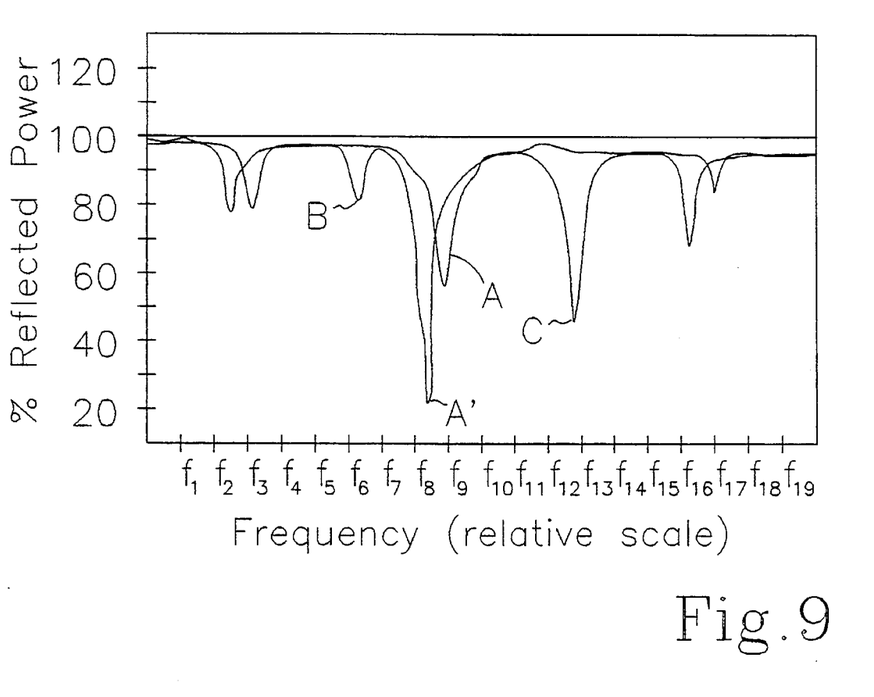
FIG. 9 is a graphical illustration of a mode pattern of a microwave cavity having a load placed therein showing percentage reflected power versus frequency, and overlaying the illustration of FIG. 8, thus illustrating the variation of the mode patterns within a microwave cavity as being dependant upon the loads placed therein.

The sample 36 to be processed, whether a gas, liquid or solid sample, is then placed into microwave cavity 34. The frequency is swept again, only at a low power level. The presence of the sample in the microwave cavity 34 has the effect of shifting the mode pattern down in frequency, which is attributable to the presence of a volume in the microwave cavity 34 whose dielectric constant is greater than unity. In addition to the downward mode shift, additional modes become apparent, which is reflective of the resonant frequencies of the workpiece 36. The new modes are due to molecular resonances for gaseous workpieces 36 and to form factor and shape resonances for the liquid and solid workpieces 36 and represent efficient frequencies at which to couple the microwave power into the reaction chemistry or sample. FIG. 9 illustrates the effect of the addition of the workpiece 36 within the microwave cavity 34. As illustrated and as previously discussed, the mode pattern of the empty cavity 34 has been shifted lower in frequency and additional modes due to the workpiece 36 have been detected. The newly detected modes B and C are attributed to the addition of the workpiece 36, with mode C being the more efficient in terms of percentage reflected power.

The initial resonance frequency at which the workpiece 36 is to be processed is, in the preferred method, determined as that frequency at which the most efficient mode occurs. The output power is then increased to begin the microwave processing. For example, to create the plasma or heat the workpiece 36, the above-referenced MLI Model T-1096 TWT can produce up to 3 kW of continuous wave (CW) power. Under high power conditions, the workpiece 36 can exhibit far different properties than when the system is cold. In the case of the plasma, large densities of electrons and ions, as well as a spectrum of product species representative of the equilibrium concentrations but also including possibly non-equilibrium metastable species, are present. In addition, the gas is "hot," and the various species are not homogeneously distributed within the microwave cavity 34. In the case of the sample to be heated, the dielectric constant of the material is a function of the temperature of the material and, thus, changes as the sample is heated. In both cases, these changed conditions can affect the mode pattern within the cavity 34, causing the frequency of the desired resonant mode to drift.

Due to the drift of the optimum resonant mode, graphical illustrations of percentage reflected power versus fequency will change accordingly. Thus, monitoring such reflected power yields the ability to maintain optimum coupling. In the method of the present invention, the percentage reflected power is monitored over a narrow frequency range near the desired mode, thus allowing the efficiency of the process to be maintained at a maximum.

Making use of the capability of the TWT 20 to handle multiple, simultaneous signals at different frequencies, while driving the plasma or heating the workpiece 20 at a high power level using the initial resonant frequency of choice, the microwave chamber 34 is simultaneously probed with a low-power signal over the entire frequency range. The percentage reflected power versus frequency is then determined for this low-power, probe signal. The high-power mode spectrum is then compared with the low-power mode spectrum, which is ground state. A comparison of the mode spectrums illustrates the effectiveness of the resonant frequency of choice. Thus, a more appropriate, high-power resonant frequency can be chosen. This method will in some instances involve the discovery and use of a mode which is non-existent under the initial low-power condition or which might not appear optimum under the low-power testing. In the case of the plasma, the non-existence of the now-optimum mode may be due to a relatively weak absorbance at low power due to the population of relevant species. As will be appreciated by those skilled in the art, many other factors may influence the optimum resonant frequency as well.

While continuing to drive a mode selected using the initial low-power criteria, a second resonant frequency characteristic of the hot plasma or sample may be simultaneously driven at high power. For a TWT 20 having an output of 3 kW, two signals at a power level in the range of 1 to 1.5 Kw each can be simultaneously driven. Thus, the processing of the workpiece 36 may be performed at two modes simultaneously, as opposed to one mode being used to process with the other used strictly for monitoring.

In a microwave-associated deposition process, for deposited materials such as diamond which have a resonance within the frequency range of the TWT 20, a low-power frequency probe can be used as a direct sensor to monitor the film growth. Simultaneously, a high-power signal is used to procure the deposition. As described previously, a TWT 20 having the capability of outputting two signals simultaneously may be used for this purpose. By correlating the strength of the absorption at that frequency with film thickness, in situ sensing for a degree of intelligent process control is achieved.

Figure 10:
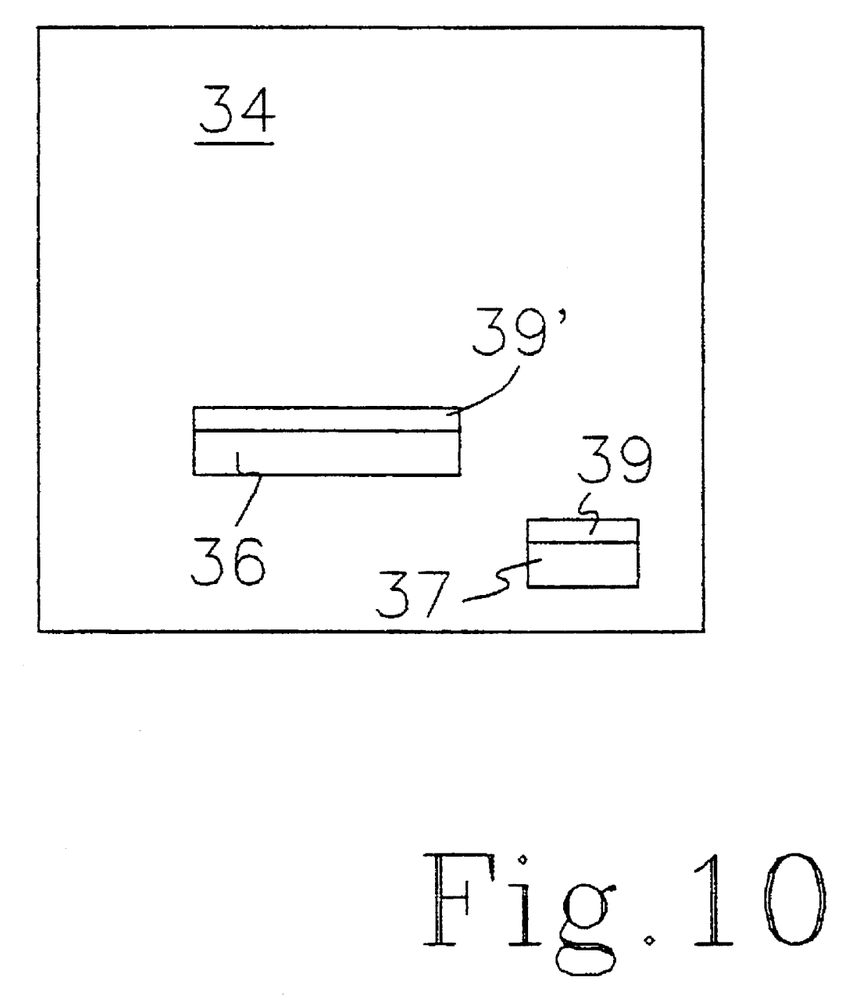
FIG. 10 is a view of a furnace cavity in which is placed dielectric body along with the workpiece during a microwave-assisted coating process, whereby changes in the resonant properties of the dielectric body indicate the thickness of the coating being deposited on both the dielectric body and the workpiece.

Alternatively to the direct sensing of the film growth as indicated, indirect methods may also be used. Such instances occur especially when the optimum resonant frequency for the film is outside the frequency range of the TWT 20. One such example of an indirect technique for sensing film deposition includes placing a body of a dielectric material 37 in the microwave cavity 34 such that the dielectric body 37 has a resonant frequency within the frequency range of the TWT 20. As the dielectric body 37 is coated with a layer 39, the change in the resonant frequency is used as a measure of the coating thickness 39' on the workpiece 36.

In another method of indirectly sensing film deposition, a piezo-electric crystal is substituted for the dielectric body 37. The piezo-electric crystal has a resonant frequency which changes as the deposited film thickness increases. The crystal is excited directly by the TWT 20 or by an external electronic means, with the response being measured during the low-power microwave sweep.

The frequency range of the TWT 20 allows a high degree of process control information to be derived by examining the reflected power at many frequencies simultaneously. The values of reflected power at each of n frequencies can be expressed as a vector of dimension n. For example, the graphical illustrations of reflected power spectra shown in FIGS. 8 and 9 can easily be represented as vectors of any desired dimensionality, limited only by the frequency resolution of the measurement system used. As shown in the figures, discrete frequencies can be selected (indicated as $f_1$, $f_2, \ldots, f_{19}$) and the values of reflected power at these frequencies define a vector in "frequency space". To illustrate this method, one might define vectors using the reflected power at frequencies $f_2, F_3, f_6, f_8, f_9, f_{12}, f_{15}$ and $f_{16}$. The empty cavity would correspond to the vector [95, 75, 95, 60, 70, 95, 95, 80] whereas the loaded cavity would correspond to the vector [75, 95, 80, 20, 90, 55, 95, 65] and so on. Those skilled in the art will appreciate that the two vectors given above are easily distinguished from one another. Any number of such vectors, or signatures, are measurable, with each representing a different set of process conditions. These signatures are then used to train a neural network or other pattern classifier. The pattern classifier monitors the process in real time and provides a degree of active control by automatically adjusting process parameters to maintain those conditions which yield the signature characteristic of the desired operating regime. It will be understood by those skilled in the art that many suitable pattern classification techniques exist, including those using analog and digital neural networks. Further, it will be understood by such artisans that these pattern classification techniques can be implemented either as application-specific hardware or as software operating within a general-purpose computer or device.

While several preferred embodiments of the variable frequency microwave heating apparatus have been shown and described, it will be understood that such descriptions are not intended to limit the disclosure, but rather it is intended to cover all modifications and alternate methods falling within the spirit and the scope of the invention as defined in the appended claims or their equivalents.

Having thus described the aforementioned invention, We claim:

1. A variable frequency microwave heating apparatus for processing selected materials, said variable frequency microwave heating apparatus including a microwave furnace which defines a multi-mode cavity for processing said selected materials, and said variable frequency microwave heating apparatus comprising:

a first microwave signal generator for generating at least a first signal with a selected waveform, frequency, and amplitude;

a second microwave signal generator for generating at least a second signal with a selected waveform, frequency, and amplitude;

a first signal amplifier for amplifying said first signal, said first signal amplifier producing a first set of microwaves within a selected frequency range and defining a center frequency, said first set of microwaves having an associated power with a selected amplitude, said first signal amplifier comprising a first microwave electron device;

a second signal amplifier for amplifying said second signal, said second signal amplifier producing a second set of microwaves within a selected frequency range and defining a center frequency, said second set of microwaves having an associated power with a selected amplitude, said second signal amplifier comprising a second microwave electron device;

a first power supply for supplying power to said first signal amplifier;

a second power supply for supplying power to said second signal amplifier;

a transmitter for conveying said first and second sets of microwaves into said microwave furnace;

a signal director for directing said first and second sets of microwaves into said microwave furnace and microwaves reflected from said microwave furnace into a reflected load dissapator, said reflected load dissipator for dissipating said microwaves from said microwave furnace, said microwaves reflected from said microwave furnace having an associated power and magnitude thereof, a system monitor for monitoring said magnitude of said power associated with said first and second sets of microwaves conveyed to said microwave furnace and said magnitude of said power associated with said microwaves reflected from said microwave furnace, said system monitor serving to measure reflected power at a plurality of frequencies, whereby process diagnostic information may be obtained from said plurality of frequencies; and a data processor for processing output from said system monitor.

2. The variable frequency microwave heating apparatus of claim 1 wherein said first signal amplifier defines a useful bandwidth of at least five percent of said first signal amplifier center frequency and wherein said second signal amplifier defines a useful bandwidth of at least five percent of said second signal amplifier center frequency.

3. The variable frequency microwave heating apparatus of claim 1 wherein said first and second microwave electron devices are each selected from the group consisting of a traveling wave tube, a twystron, a klystron, a crossed-field amplifier, a coaxial magnetron, and a gyrotron.

4. The variable frequency microwave heating apparatus of claim 1 wherein said data processor includes at least a neural network.

5. The variable frequency microwave heating apparatus of claim 1 wherein said system monitor includes at least a device for measuring microwave signals at a plurality of frequencies and said data processor includes at least a converter for converting said measured microwave signals into distinctive signatures and a device for at least classifying said signatures.

6. The variable frequency heating apparatus of claim 5 wherein said device for measuring microwave signals includes at least an analog-to-digital converter.

7. The variable frequency microwave heating apparatus of claim 5 wherein said device for at least classifying said signatures includes at least a neural network.

8. The variable frequency heating apparatus of claim 1 wherein said system monitor includes at least an antenna received within said multi-mode cavity, said antenna being provided for transmitting microwave energy into said multi-mode cavity and receiving microwave energy from said multi-mode cavity.

9. The variable frequency microwave heating apparatus of claim 1 wherein said system monitor includes a frequency discriminator.

10. The variable ferquency microwave heating apparatus of claim 9 wherein said frequency discriminator includes a device selected from the group consisting of high-pass filters, low-pass filters, band-pass filters, band-reject filters, spectrum analyzers, tracking band-pass filters, tracking band-reject filters, scalar network analyzers, vector network analyzers, and frequency synthesizers.

11. The variable frequency microwave heating apparatus of claim 1 wherein said power supply is adjustable whereby said amplitude of said signal generated by said signal generator is selectively modulated.

12. The variable frequency microwave heating apparatus of claim 1 further comprising a signal amplitude controller for selectively modulating said amplitude of said signal generated by said signal generator.

13. The variable frequency microwave heating apparatus of claim 1 wherein said output from said system monitor includes information related to at least one selected physical property of said selected materials being processed.

14. The variable frequency microwave heating apparatus of claim 13 wherein said selected material being processed is a polymer and said at least one selected physical property includes at least one property selected from the group consisting of the degrees of polymerization, curing, and cross-linking of said polymer.

15. The variable frequency microwave heating apparatus of claim 13 wherein said selected material being processed is a ceramic and said at least one selected physical property includes at least one property selected from the group consisting of density, temperature, grain size and distribution of phases.

16. The variable frequency microwave heating apparatus of claim 13 wherein at least a portion of said selected material being processed is transformed into a plasma state and said at least one selected physical property includes state properties of said plasma.

17. The variable frequency microwave heating apparatus of claim 1 wherein said signal director is provided with a cooling device for dissipating heat accumulated through operation of said signal director.

18. A variable frequency microwave heating apparatus for processing selected materials, said variable frequency microwave heating apparatus including a microwave furnace which defines a multi-mode cavity for processing said selected materials, and said variable frequency microwave heating apparatus comprising:

a microwave signal generator for generating at least a first signal with a selected waveform, frequency, and amplitude and a second signal with a selected waveform, frequency, and amplitude;

a signal amplifier for amplifying said first and second signals, said signal amplifier producing a first set and a second set of microwaves within a selected frequency range and defining a center frequency, said first set of microwaves having an associated power with a selected amplitude, said second set of microwaves having an associated power with a selected amplitude, said signal amplifier comprising a microwave electron device;

a power supply for supplying power to said signal amplifier;

a transmitter for conveying said first and second sets of microwaves into said microwave furnace;

a signal director for directing said first and second sets of microwaves into said microwave furnace and microwaves reflected from said microwave furnace into a reflected load dissipator, said reflected load dissipator for dissipating said microwaves reflected from said microwave furnace, said microwaves reflected from said microwave furnace having an associated power and magnitude thereof;

a system monitor for monitoring said magnitude of said power associated with said first and second sets of microwaves conveyed to said microwave furnace and said magnitude of said power associated with said microwaves reflected from said microwave furnace, said system monitor serving to measure reflected power at a plurality of frequencies, whereby process diagnostic information may be obtained from said plurality of frequencies; and a data processor for processing output from said system monitor.

19. The variable frequency microwave heating apparatus of claim 18 wherein said signal amplifier defines a useful bandwidth of at least five percent of said signal amplifier center frequency.

20. The variable frequency microwave heating apparatus of claim 18 wherein said microwave electron device is selected from the group consisting of a traveling wave tube, a twystron, a klystron, a crossed-field amplifier, a coaxial magnetron, and a gyrotron.

21. The variable frequency microwave heating apparatus of claim 18 wherein said data processor includes at least a neural network.

22. The variable frequency microwave heating apparatus of claim 18 wherein said system monitor includes at least a device for measuring microwave signals at a plurality of frequencies and said data processor includes at least a converter for converting said measured microwave signals into distinctive signatures and a device for at least classifying said signatures.

23. The variable frequency heating apparatus of claim 22 wherein said device for measuring microwave signals includes at least an analog-to-digital converter.

24. The variable frequency microwave heating apparatus of claim 22 wherein said device for at least classifying said signatures includes at least a neural network.

25. The variable frequency heating apparatus of claim 18 wherein said system monitor includes at least an antenna received within said multi-mode cavity, said antenna being provided for transmitting microwave energy into said multi-mode cavity and receiving microwave energy from said multi-mode cavity.

26. The variable frequency microwave heating apparatus of claim 18 wherein said system monitor includes a frequency discriminator.

27. The variable ferquency microwave heating apparatus of claim 26 wherein said frequency discriminator includes a device selected from the group consisting of high-pass filters, low-pass filters, band-pass filters, band-reject filters, spectrum analyzers, tracking band-pass filters, tracking band-reject filters, scalar network analyzers, vector network analyzers, and frequency synthesizers.

28. The variable frequency microwave heating apparatus of claim 18 wherein said power supply is adjustable whereby said amplitude of said signal generated by said signal generator is selectively modulated.

29. The variable frequency microwave heating apparatus of claim 18 further comprising a signal amplitude controller for selectively modulating said amplitude of said signal generated by said signal generator.

30. The variable frequency microwave heating apparatus of claim 18 wherein said output from said system monitor includes information related to at least one selected physical property of said selected materials being processed.

31. The variable frequency microwave heating apparatus of claim 30 wherein said selected material being processed is a polymer and said at least one selected physical property includes at least one property selected from the group consisting of the degrees of polymerization, curing, and cross-linking of said polymer.

32. The variable frequency microwave heating apparatus of claim 30 wherein said selected material being processed is a ceramic and said at least one selected physical property includes at least one property selected from the group consisting of density, temperature, grain size and distribution of phases.

33. The variable frequency microwave heating apparatus of claim 30 wherein at least a portion of said selected material being processed is transformed into a plasma state and said at least one selected physical property includes state properties of said plasma.

34. The variable frequency microwave heating apparatus of claim 18 wherein said signal director is provided with a cooling device for dissipating heat accumulated through operation of said signal director.

35. A method of processing a selected material comprising the steps of:
   a. placing said selected material in a variable frequency microwave heating apparatus including a microwave furnace including a multi-mode cavity;
   b. simultaneously irradiating said selected material with at least two microwave signals with at least two frequencies being defined by said at least two microwave signals;
   c. measuring microwave signals within said multi-mode cavity, said microwave signals including at least microwaves reflected from said microwave furnace, said step of measuring microwave signals being performed to accomplish measurement of reflected power at a plurality of frequencies to obtain diagnostic information;
   d. processing said diagnostic information obtained in said step of measuring microwave signals; and
   e. controlling at least one of said at least two frequencies based upon results from said step of processing measurements detected in said step of measuring microwave signals.

36. The method of claim 35 wherein said step of irradiating said selected material with microwaves of varying frequencies is performed within said variable frequency microwave heating apparatus, said variable frequency microwave heating apparatus comprising:
   a first microwave signal generator for generating at least a first signal with a selected waveform, frequency, and amplitude;
   a second microwave signal generator for generating at least a second signal with a selected waveform, frequency, and amplitude;
   a first signal amplifier for amplifying said first signal, said first signal amplifier producing a first set of microwaves within a selected frequency range and defining a center frequency, said first set of microwaves having an associated power with a selected amplitude, said first signal amplifier comprising a first microwave electron device;
   a second signal amplifier for amplifying said second signal, said second signal amplifier producing a second set of microwaves within a selected frequency range and defining a center frequency, said second set of microwaves having an associated power with a selected amplitude, said second signal amplifier comprising a second microwave electron device;
   a first power supply for supplying power to said first signal amplifier;
   a second power supply for supplying power to said second signal amplifier;
   a transmitter for conveying said first and second sets of microwaves into said microwave furnace;
   a signal director for directing said first and second sets of microwaves into said microwave furnace and microwaves reflected from said microwave furnace into a reflected load dissipator, said reflected load dissipator for dissipating said microwaves reflected from said microwave furnace, said microwaves reflected from said microwave furnace having an associated power and magnitude thereof;
   a system monitor for monitoring said magnitude of said power associated with said first and second sets of microwaves conveyed to said microwave furnace and said magnitude of said power associated with said microwaves reflected from said microwave furnace, said system monitor serving to monitor an efficiency of said variable frequency microwave heating apparatus; and
   a data processor for processing output from said system monitor.

37. The method of claim 35 wherein said step of irradiating said selected material with microwaves of varying frequencies is performed within said variable frequency microwave heating apparatus, said variable frequency microwave heating apparatus comprising:
   a microwave signal generator for generating at least a first signal with a selected waveform, frequency, and amplitude and a second signal with a selected waveform, frequency, and amplitude;
   a signal amplifier for amplifying said first and second signals, said signal amplifier producing a first set and a second set of microwaves within a selected frequency range and defining a center frequency, said first set of microwaves having an associated power with a selected amplitude, said second set of microwaves having an associated power with a selected amplitude, said signal amplifier comprising a microwave electron device;

a power supply for supplying power to said signal amplifier;

a transmitter for conveying said first and second sets of microwaves into said microwave furnace;

a signal director for directing said first and second sets of microwaves into said microwave furnace and microwaves reflected from said microwave furnace into a reflected load dissipator, said reflected load dissipator for dissipating said microwaves reflected from said microwave furnace, said microwaves reflected from said microwave furnace having an associated power and magnitude thereof;

a system monitor for monitoring said magnitude of said power associated with said first and second sets of microwaves conveyed to said microwave furnace and said magnitude of said power associated with said microwaves reflected from said microwave furnace, said system monitor serving to monitor an efficiency of said variable frequency microwave heating apparatus; and a data processor for processing output from said system monitor.

* * * * *